(12) United States Patent
Lattner et al.

(10) Patent No.: US 12,064,835 B2
(45) Date of Patent: Aug. 20, 2024

(54) OPERATING PANEL FOR A WELDING DEVICE

(71) Applicant: Fronius International GmbH, Pettenbach (AT)

(72) Inventors: Peter Lattner, Pettenbach (AT); Günther Neubacher, Pettenbach (AT); Bernhard Eckl, Pettenbach (AT); Manuel Strasser, Pettenbach (AT); Axel Hörzing, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 544 days.

(21) Appl. No.: 17/439,685

(22) PCT Filed: Mar. 18, 2020

(86) PCT No.: PCT/EP2020/000071
§ 371 (c)(1),
(2) Date: Sep. 15, 2021

(87) PCT Pub. No.: WO2020/187442
PCT Pub. Date: Sep. 24, 2020

(65) Prior Publication Data
US 2022/0161347 A1     May 26, 2022

(30) Foreign Application Priority Data

Mar. 18, 2019  (EP) .................................... 19163549

(51) Int. Cl.
*B23K 9/10*    (2006.01)
*B23K 9/095*   (2006.01)
(Continued)

(52) U.S. Cl.
CPC ............ *B23K 9/1006* (2013.01); *B23K 9/095* (2013.01); *B23K 9/32* (2013.01); *G05G 1/10* (2013.01); *G06F 3/04847* (2013.01)

(58) Field of Classification Search
CPC ........ B23K 9/1006; B23K 9/095; B23K 9/32; G05G 1/10; G06F 3/04842; G06F 3/04847
See application file for complete search history.

(56) References Cited

U.S. PATENT DOCUMENTS 8,592,722 B2 * 11/2013 Ulrich .................. B23K 9/1062
                                                     700/212
10,747,393 B2 *  8/2020 Albright ............. G06F 3/04847
(Continued)

FOREIGN PATENT DOCUMENTS

CN        106527894 A      3/2017
DE        93 01 390 U1     4/1993
(Continued)

OTHER PUBLICATIONS

International Search Report corresponding to PCT Application No. PCT/EP2020/000071, mailed Aug. 10, 2020 (German and English language document) (7 pages).
(Continued)

*Primary Examiner* — Brian W Jennison
(74) *Attorney, Agent, or Firm* — Maginot, Moore & Beck, LLP (57) ABSTRACT

Operating panel (1) for a welding device (SG) comprising a welding parameter display unit (2) for displaying welding parameters, and comprising at least one operating element (3) which can be actuated manually by a user, wherein the operating panel (1) can be switched between a welding parameter selection mode and a welding parameter editing mode by actuating the operating element (3), wherein in the welding parameter selection mode one of the welding
(Continued)

parameters of the welding parameter display unit (2) can be selected by rotating the operating element (3), and wherein in the welding parameter editing mode a parameter value of a selected welding parameter of the welding parameter display unit (2) can be set by rotating the operating element (3).

10 Claims, 7 Drawing Sheets (51) Int. Cl.
*B23K 9/32* (2006.01)
*G05G 1/10* (2006.01)
*G06F 3/04847* (2022.01)

(56) References Cited

U.S. PATENT DOCUMENTS

| | | | |
|---|---|---|---|
| 10,983,684 B2* | 4/2021 | Evans | B23K 9/1062 |
| 2004/0232128 A1 | 11/2004 | Niedereder et al. | |
| 2009/0071949 A1* | 3/2009 | Harris | B23K 9/1006 |
| | | | 219/130.1 |
| 2009/0152251 A1* | 6/2009 | Dantinne | B23K 9/0953 |
| | | | 219/125.1 |
| 2010/0062405 A1* | 3/2010 | Zboray | G09B 19/24 |
| | | | 434/234 |
| 2011/0114611 A1* | 5/2011 | Cole | B23K 9/32 |
| | | | 219/136 |
| 2013/0112673 A1* | 5/2013 | Petrilla | B23K 9/02 |
| | | | 219/130.1 |

FOREIGN PATENT DOCUMENTS

| | | |
|---|---|---|
| DE | 197 33 638 A1 | 2/1999 |
| DE | 20 2006 009 014 U1 | 8/2006 |
| DE | 10 2009 040 957 A1 | 4/2011 |
| JP | 2003-136251 A | 5/2003 |
| JP | 2005-527381 A | 9/2005 |
| JP | 2006-82091 A | 3/2006 |
| JP | 2008-30082 A | 2/2008 |
| JP | 2015-512336 A | 4/2015 |
| WO | 2018/088372 A1 | 5/2018 |

OTHER PUBLICATIONS

European Search Report corresponding to European Patent Application No. 19 16 3549, dated Oct. 9, 2019 (7 pages).

* cited by examiner

OPERATING PANEL FOR A WELDING DEVICE

This application is a 35 U.S.C. 371 National Stage application of PCT/EP2020/000071, filed Mar. 18, 2020, and claims priority to European Application No. 19163549.9 filed on Mar. 18, 2019. The entire contents of the above-mentioned patent applications are incorporated herein by reference as part of the disclosure of this U.S. application.

The invention relates to an operating panel for a welding device and to a method for configuring welding parameters of a welding device by means of an operating panel.

DE 20 2006 009014 U1 relates to an apparatus for controlling a welding device having a remote operating unit. DE 197 33 638 A1 discloses an apparatus for controlling a welding device having a control means. US 2013/112673 A1 relates to the use of mobile communication devices as a user interface for welding systems. US 2004/232128 A1 relates to a remote controller for a welding device. Conventional welding devices have an operating panel for operating the welding device, in particular for setting welding parameters of a welding process performed by the welding device. The essential welding parameters can be selected by means of keys, can be changed by means of a setting wheel and can be displayed on a digital display during the welding process.

The selection of welding parameters, in particular for setting a corresponding welding parameter value, is generally made via keys or buttons. The provision of such keys on a conventional operating panel has, on the one hand, the disadvantage that the operating panel is relatively complex for a user and therefore the inputting of welding parameters is made more difficult, and on the other hand the keys take up space on the operating panel and so minimising or reducing the size of the operating panel, in particular for portable welding devices, is made more difficult or is prevented.

It is therefore an object of the present invention to provide an operating panel for a welding device which permits simple and error-free inputting of welding parameters and requires little surface area when being integrated in a welding device.

In accordance with the invention, this object is achieved by an operating panel for a welding device having the features stated in claim 1.

Accordingly, the invention provides an operating panel for a welding device comprising a welding parameter display unit for displaying welding parameters, and comprising at least one operating element which can be actuated manually by a user, wherein the operating panel can be switched between a welding parameter selection mode and a welding parameter editing mode by pulling or pushing the operating element, wherein in the welding parameter selection mode one of the welding parameters of the welding parameter display unit can be selected by rotating the operating element, and wherein in the welding parameter editing mode a parameter value of a selected welding parameter of the welding parameter display unit can be set by rotating the operating element, wherein after a welding process performed by the welding device has started, the operating panel switches to a welding parameter display mode, wherein the welding parameters in the partitioned function curve of the welding parameter display unit of the operating panel are sequentially displayed after the welding process has started in the welding parameter display mode in different successive phases of the welding process corresponding to the parameter value set in the welding parameter editing mode and are physically set for performing the welding process by a welding current source of the welding device.

The operating panel in accordance with the invention offers the advantage that the operating element can be used for switching between two operating modes and also for setting parameter values. In this way, space otherwise required for other operating elements, in particular keys or the like, can be saved and so the operating panel requires relatively little space overall. The operating panel in accordance with the invention can thus also be provided in a space-saving manner on welding devices having a relatively small housing, in particular also on portable welding devices. Furthermore, the clarity of the operating panel is increased, and so the selection of operating modes and/or the setting of parameter values is facilitated for a user and inputs are effected in a more reliable manner.

In one possible embodiment of the operating panel in accordance with the invention, the manually actuatable operating element comprises an operating wheel which can be set in an incremental manner.

In a further possible embodiment of the operating panel in accordance with the invention, a welding parameter is displayed in each case by an associated display segment of a partitioned function curve of the welding parameter display unit.

In a further possible embodiment of the operating panel in accordance with the invention, the display segment of the partitioned function curve of the welding parameter display unit comprises a transparent synthetic material block which can be illuminated by one or more lighting means, which can be dimmed, in particular light-emitting diodes.

In a further possible embodiment of the operating panel in accordance with the invention, the surface, directed towards the user, of each transparent synthetic material block of a display segment of the partitioned function curve is surface-treated to increase light scattering.

In a further possible embodiment of the operating panel in accordance with the invention, in the welding parameter editing mode the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are not illuminated by the associated lighting means.

In a further possible embodiment of the operating panel in accordance with the invention, in the welding parameter selection mode the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are illuminated by the associated lighting means with dimmed illuminating power.

In a further possible embodiment of the operating panel in accordance with the invention, in the welding parameter display mode the display segment of the currently active welding parameter physically set by the welding current source of the welding device within the partitioned function curve of the welding parameter display unit is illuminated by the associated lighting means with dimmed illuminating power.

In a further possible embodiment of the operating panel in accordance with the invention, the operating panel comprises at least one digital display for displaying a parameter value of a welding parameter selected in the welding parameter selection mode or a welding parameter actively set by the welding current source of the welding device during the welding process.

According to a further aspect, the invention further provides a welding device having the features stated in claim 10.

Accordingly, the invention provides a welding device having an operating panel according to the first aspect of the invention and having a welding current source for setting welding parameters during the welding process corresponding to the parameter values, set in the welding parameter editing mode, of the welding parameters selected in the welding parameter selection mode.

According to a further aspect, the invention further provides a method for configuring welding parameters of a welding device having the features stated in claim 11.

Accordingly, the invention provides a method for configuring welding parameters of a welding device by means of a manually actuatable operating panel of a welding device according to the first aspect of the invention, wherein the following steps are performed for each welding parameter to be configured: switching the operating panel to a welding parameter selection mode by pushing or pulling an operating element of the operating panel, rotating the operating element in the welding parameter selection mode to select the welding parameter to be configured, switching from the welding parameter selection mode to a welding parameter editing mode of the welding device by pushing the operating element of the operating panel again, and rotating the operating element in the welding parameter editing mode to set a welding parameter value of the selected welding parameter to be configured, wherein after a welding process performed by the welding device has started, the operating panel switches to a welding parameter display mode, wherein the welding parameters in the partitioned function curve of the welding parameter display unit of the operating panel are sequentially displayed after the welding process has started in the welding parameter display mode in different successive phases of the welding process corresponding to the parameter value set in the welding parameter editing mode and are physically set for performing the welding process by a welding current source of the welding device.

In one possible embodiment of the method in accordance with the invention, in the welding parameter editing mode the display segment of the selected welding parameter within a partitioned function curve of the welding parameter display unit is illuminated by the associated lighting means with full undimmed illuminating power whilst the display segments of the remaining unselected welding parameters within the partitioned function curve of the welding parameter display unit are not illuminated by the associated lighting means.

In a further possible embodiment of the method in accordance with the invention, in the welding parameter selection mode the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are illuminated by the associated lighting means with dimmed illuminating power.

In a further possible embodiment of the method in accordance with the invention, the parameter value, set in the welding parameter editing mode, of the welding parameter to be configured is stored in a data memory of the welding device and is read out from the data memory and physically set during a subsequent welding process performed by a welding current source of the welding device.

Embodiments of the operating panel in accordance with the invention and of the welding device in accordance with the invention and of the method in accordance with the invention for configuring welding parameters of a welding device are explained in more detail hereinafter with reference to the attached figures.

Figure 1:
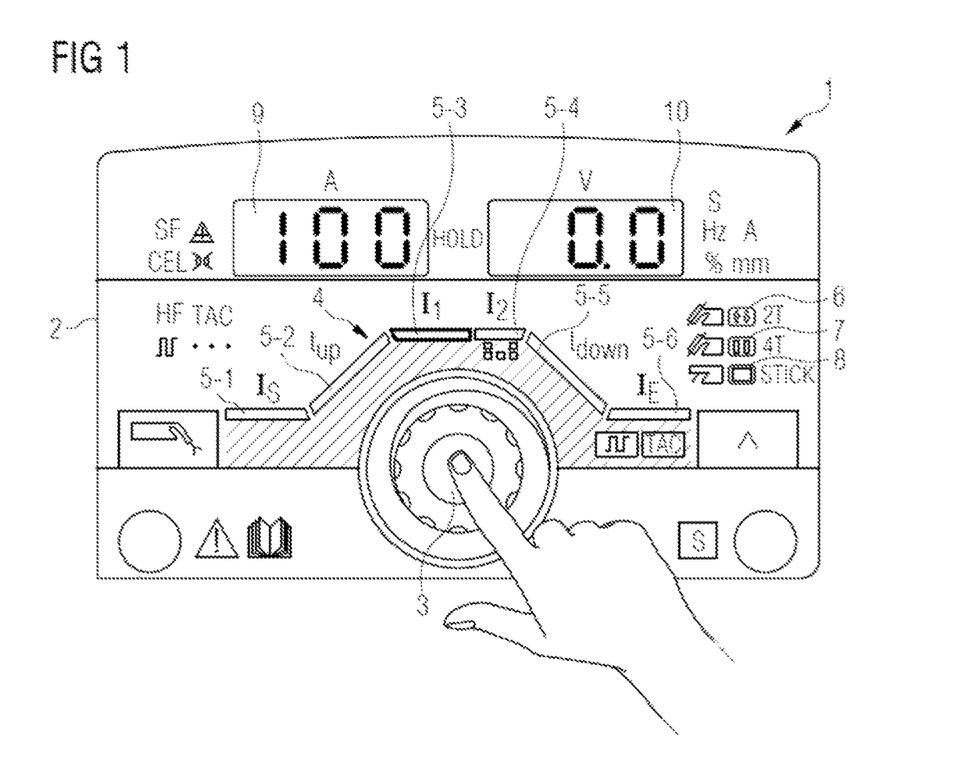
FIG. 1 shows a view of an exemplary exemplified embodiment of an operating panel in accordance with the invention for a welding device.

As can be seen from FIG. 1, an operating panel 1 in accordance with the invention according to the first aspect of the invention is used for setting and displaying different welding parameters of a welding device. The operating panel 1 has a welding parameter display unit 2 for displaying welding parameters with different display elements. Furthermore, the operating panel 1 has an operating element 3 which can be actuated by a user. This manually actuatable operating element 3 can be actuated or operated e.g. by the hand of a user. By pushing the operating element 3, a switch can be made between a welding parameter selection mode and a welding parameter editing mode. In the welding parameter selection mode, one of the welding parameters of the welding parameter display unit 2 can be selected by rotating the operating element 3. In the welding parameter editing mode, a parameter value of a welding parameter selected in the welding parameter selection mode can be set by rotating the operating element 3. In the exemplified embodiment illustrated in FIG. 1, the manually actuatable operating element 3 comprises an operating wheel which can be set in an incremental manner or a rotary push regulating unit. Prior to initiating the welding process, a user can switch the operating panel 1, as illustrated in FIG. 1, to the welding parameter selection mode by pushing the operating element 3. As soon as the operating panel 1 has been switched to the welding parameter selection mode, the user can select or choose one of the configurable welding parameters of the welding device by rotating the operating element 3. By pushing the operating element 3 again, the user can switch the operating element 3 from the welding parameter selection mode to a welding parameter editing mode. As soon as the operating panel 1 is in the welding parameter editing mode, the user can then set a parameter value of the selected welding parameter to be configured by rotating the operating element 3.

Starting from the state in FIG. 1, the user can call up function curve parameters, as shown in FIGS. 2A to 2H, by pushing the operating element 3. In the illustrated exemplified embodiment, the welding parameter display unit 2 comprises a partitioned function curve 4. Different welding parameters of the welding device can each be displayed by an associated display segment 5 of the partitioned function curve 4. In one possible embodiment, each display segment 5 of the partitioned function curve 4 of the welding parameter display unit 2 comprises a transparent synthetic material block which can be illuminated by one or more lighting means which can be dimmed. These lighting means which can be dimmed can be e.g. light-emitting diodes. The number of the display segments 5 within the partitioned function curve 4 may be different in different embodiment variants. The function curve 4 provides the user with an overview of essential welding parameters for the welding operation. The sequence of the welding parameters can be predetermined by a so-called washing line structure, as can be seen in FIG. 1. The welding parameters reproduced in the function curve 4 can comprise, in one possible embodiment, a starting current $I_S$, an up-slope time frame $t_{up}$, at least one main current, a down-slope time frame $t_{down}$ and a final current $I_E$. The starting current $I_S$ can be stored separately for different types of operation. The down-slope time frame $t_{down}$ indicates the time frame in which, in the welding process, the current decreases from the main current to the final current $I_E$. The down-slope time frame $t_{down}$ can be stored separately for different types of operation, in particular 2-cycle operation or 4-cycle operation. In one possible embodiment, the operating panel 1 of the welding device additionally comprises keys for selecting a type of operation of the welding device, in particular 2-cycle operation, 4-cycle operation or a stick electrode welding operation of the welding device. The welding parameters contained in the function curve 4 are each displayed by an associated display segment 5-1, 5-2, 5-3, 5-4, 5-5, 5-6. Accordingly, in the implementation example shown in FIG. 1, the function curve 4 comprises six display segments 5-1 to 5-6. The first display segment 5-1 is provided for the starting current $I_S$ of the welding device. The display segment 5-2 reflects the up-slope time frame $t_{up}$. The third display segment 5-3 and the fourth display segment 5-4 are provided for two main currents I1, I2. The fifth display segment 5-5 displays the down-slope time frame $t_{down}$. The sixth display segment 5-6 of the function curve 4 is provided for the final current $I_E$.

Furthermore, the welding parameter display unit 2 has, in the illustrated exemplified embodiment, keys 6, 7, 8 for selecting 2-cycle operation, 4-cycle operation and stick electrode welding operation (STICK). Keys 6, 7, 8 are optionally provided. Each display segment 5-$i$ of the partitioned function curve 4 of the welding parameter display 2 comprises, in one possible embodiment, a transparent synthetic material block which is illuminated by a light-emitting diode located therebelow. In a preferred embodiment, the surface, directed towards the user, of each transparent synthetic material block of the partitioned function curve 4 is surface-treated to increase light scattering.

In one possible embodiment, in the welding parameter editing mode the display segment 5-$i$ of the selected welding parameter within the partitioned function curve 4 of the welding parameter display unit 2 is illuminated by the associated lighting means or the associated light-emitting diode with full undimmed illuminating power whilst the display segments 5-$i$ of the remaining unselected welding parameters within the partitioned function curve 4 of the welding parameter display unit 2 are not illuminated by the associated lighting means or the associated light-emitting diode located therebelow.

In the welding parameter selection mode, the display segment 5 of the selected welding parameter within the partitioned function curve 4 of the welding parameter display unit 2 is illuminated by the associated lighting means or the associated light-emitting diode with full undimmed illuminating power whilst the display segments 5 of the remaining unselected welding parameters within the partitioned function curve 4 of the welding parameter display unit 2 are illuminated by the associated or light-emitting diode LED located therebelow with dimmed illuminating power.

By rotating the operating element 3, the user can rotate back and forth between different display segments 5-$i$ of the partitioned function curve 4, as schematically shown in FIG. 2. For example, in FIG. 2A the display segment 5-3 is selected which reproduces the first main current I1, wherein the currently set welding parameter value is displayed by a first digital display 9. The first display unit 9 displays the first main current I1 with a set parameter value of 100 amperes in the illustrated example.

Figure 2A:
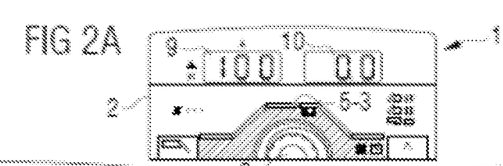
FIGS. 2A to 2H show views for explaining the mode of operation of the operating panel in accordance with the invention.
Figure 2B:
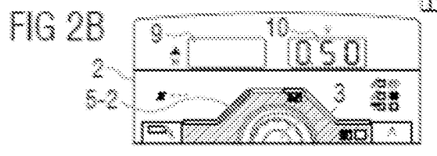

By rotating the operating element 3 to the left, the user can then select, in the illustrated example of FIG. 2B, the second display segment 5-2 for the up-slope time frame $t_{up}$. A second digital display 10 displays the currently set value for the up-slope time frame $t_{up}$, namely 0.5 seconds in the illustrated example.

Figure 2C:
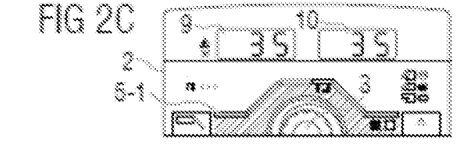

By continuing to rotate the operating element 3, the user arrives at the first display segment of the partitioned function curve 4, namely the starting current $I_S$, as shown in FIG. 2C. The starting current $I_S$ has, in the illustrated example, a current amplitude as a parameter of 35 amperes, as shown in the first display unit 9. This corresponds to 35% of the main current of 100 amperes, as displayed in the second display unit 10.

Figure 2D:
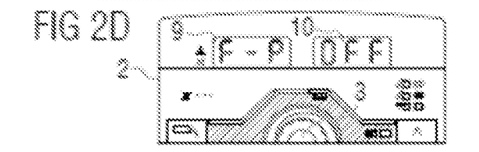
Figure 2E:
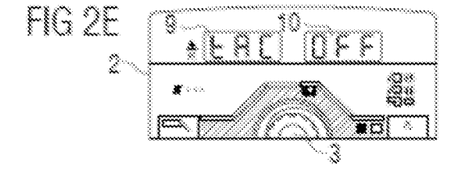

By rotating or actuating the operating element 3, the user can select the TAC with the pulse frequency F-P, which can be deactivated in the set-up, as shown in FIG. 2D. A display HF ignition illuminates when a set-up parameter HFT is set for an interval for high-frequency pulses.

Figure 2F:
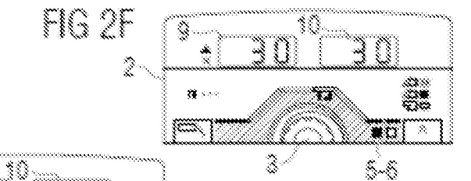

By continuing to rotate the operating element 3, the user can select e.g. the sixth display segment 5-6 for the final current $I_E$, as shown in FIG. 2F. In the illustrated example, the set current value has a final current $I_E$ of 30 amperes, as displayed by the first digital display 9, wherein this corresponds to 30% of the main current, as displayed by the second digital display 10.

Figure 2G:
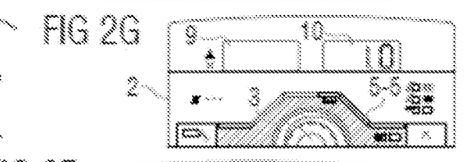
Figure 2H:
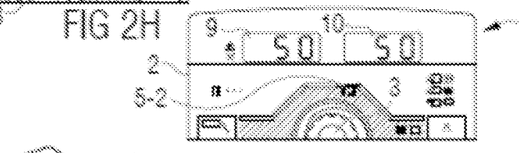

By continuing to rotate the operating element 3, the user can select the fifth display segment 5-5, as shown in FIG. 2G. The fifth display segment 5-5 of the function curve 4 shows the down-slope time frame $t_{down}$. In the illustrated example, the set down-slope time frame $t_{down}$ is 1 second, as displayed by the second digital display 10.

By rotating the operating element 3, the fourth display element 5-4 can also be selected for the second main current I2. The second main current I2 has, in the illustrated example, a current value of 50 amperes, as displayed by the first digital display unit 9, wherein this corresponds to 50% of the first main current I1, as displayed by the second digital display 10.

A user has the option, by pushing or actuating an operating element 3, of switching the operating panel 1 to the welding parameter selection mode in order then to select a welding parameter, which can be configured and is desired by him, by rotating the operating element 3, as shown in FIGS. 2A to 2E. By pushing the operating element 3 again, a switch can be made from the welding parameter selection mode to the welding parameter editing mode. As soon as the welding parameter editing mode has been selected, the user has the option of editing or setting a parameter value of the relevant welding parameter, in particular of setting a desired value.

Figure 3:
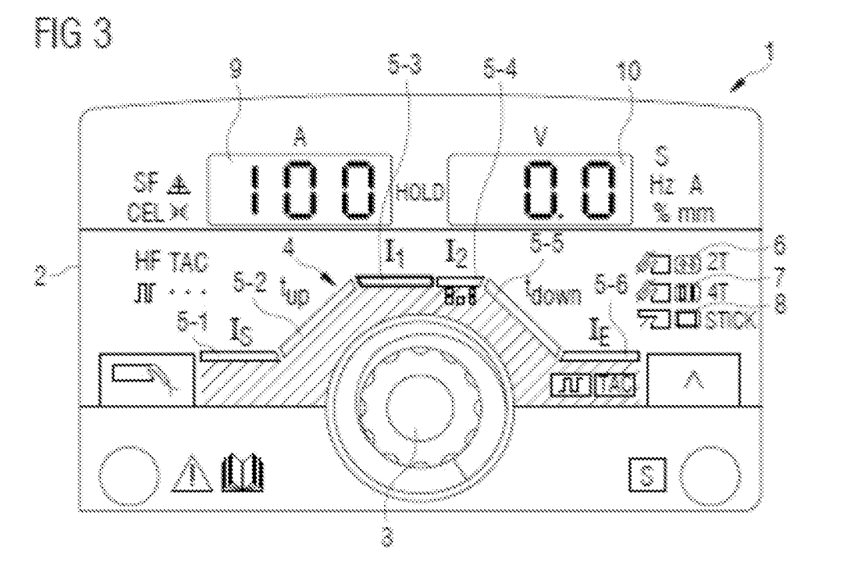
FIG. 3 shows a further view for explaining the mode of operation of the operating panel in accordance with the invention.

For example, prior to actually performing the welding process, the user can set, in the editing mode, a desired value of 100 amperes for the first main current I1, as shown in FIG. 3. As can be seen in FIG. 3, in the welding parameter editing mode, the display segment 5-3 of the relevant selected welding parameter, i.e. the first main current I1, within the partitioned function curve 4 of the welding parameter display unit 2 is illuminated by the associated lighting means, located therebelow, with full undimmed illuminating power whilst the display segments 5-1, 5-2, 5-4, 5-5, 5-6 of the remaining unselected welding parameters within the partitioned function curve 4 of the welding parameter display unit 2 are not illuminated by the associated lighting means or are dark.

In contrast, in the welding parameter selection mode the display segments 5 of the remaining unselected welding parameters within the partitioned function curve 4 of the welding parameter display unit 2 are illuminated by the associated lighting means with dimmed or reduced illuminating power, e.g. only with 30% illuminating power.

Therefore, in this preferred embodiment, the user always has the option of visually recognising whether the operating panel 1 is in the welding parameter editing mode (FIGS. 1, 3) or in a welding parameter selection mode (FIGS. 2A to 2H).

By pressing or actuating the operating element 3 multiple times, the user has the option of readily switching the operating panel 1 back and forth between the welding parameter selection mode and the welding parameter editing mode.

Figure 4A:
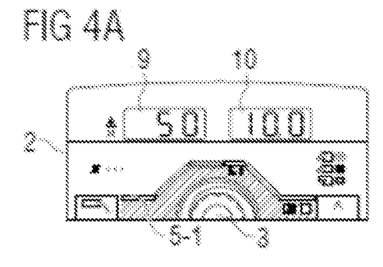
FIGS. 4A, 4B, 4C show further views of an operating panel in accordance with the invention for explaining the mode of operation thereof.
Figure 4B:
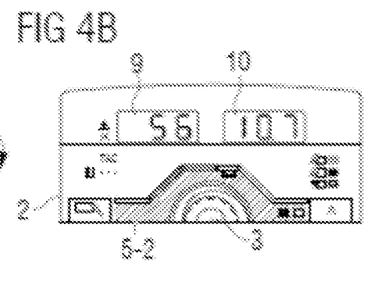
Figure 4C:
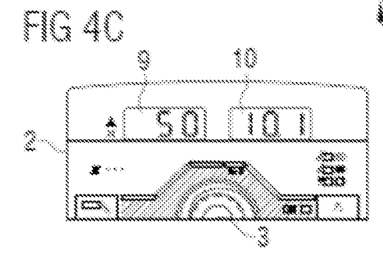

In a preferred embodiment, as soon as a welding process performed by the welding device starts or is initiated, the operating panel 1 automatically switches to a welding parameter display mode. FIGS. 4A, 4B, 4C show the welding parameter display unit 2 of the operating panel 1 whilst a welding process is being performed. In the illustrated exemplified embodiment, the currently active welding parameter is preferably illustrated in a dimmed fashion. The welding parameters in the partitioned function curve 4 of the welding parameter display unit 2 of the operating panel 1 are sequentially displayed after the welding process has started in the welding parameter display mode in different successive phases of the welding process corresponding to the parameter value set in the welding parameter editing mode and are physically set for performing the welding process by a welding current source 11 of the welding device. In the welding parameter display mode, the display segment 5 of the currently active welding parameter physically set by the welding current source 11 of the welding device within the partitioned function curve 4 of the welding parameter display unit 2 is illuminated by the associated lighting means with dimmed illuminating power. In FIG. 4A, the currently active, physically set welding parameter is the starting current $I_S$, wherein the display segment 5-1 of the currently active, physically set welding parameter is illuminated by the associated lighting means with dimmed illuminating power. The two digital displays 9, 10 display the current current value in amperes and the current voltage in volts.

FIG. 4B shows the sequential change to the next physically executed welding parameter, namely the up-slope time frame $t_{up}$, which is displayed by the display segment 5-2. In the up-slope time frame $t_{up}$, the current value is 56 amperes and the current voltage is 10.7 volts at the point of time which is shown by way of example. After the main current is reached, the corresponding display is likewise displayed in a dimmed fashion. In the illustrated example, the current value is 50 amperes and the voltage is 10.1 volts, as can be seen in FIG. 4C.

Figure 5:
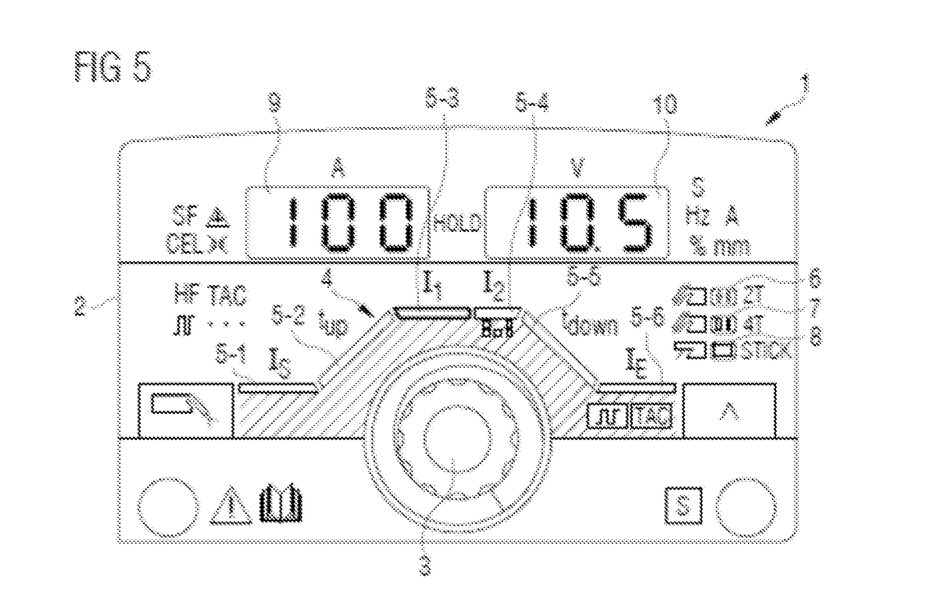
FIG. 5 shows a further view for explaining the mode of operation of an operating panel in accordance with the invention.

After the welding process has completely finished, hold values, i.e. average values, of the current value or the voltage value can be displayed and a display "Hold" illuminates. In the illustrated example, the hold current value is 100 amperes and the hold voltage is 10.5 volts, as shown in FIG. 5.

The operating panel 1 in accordance with the invention can comprise further operating elements 3. For example, in one possible embodiment the operating panel 1 can additionally display as a welding parameter a balance for setting a fusion power and/or an electrode diameter of a welding electrode.

Figure 6:
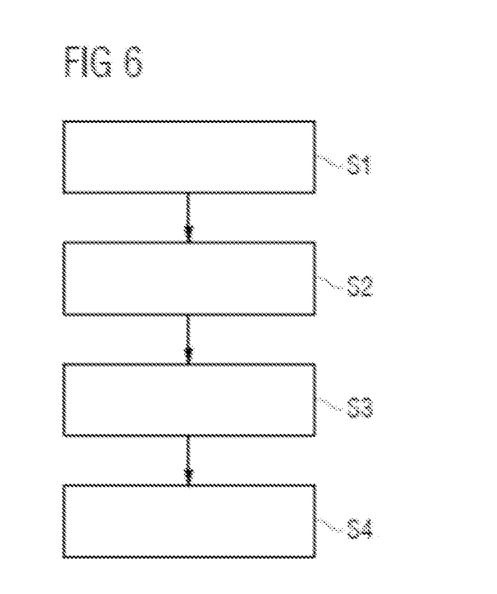
FIG. 6 shows a flow diagram for illustrating an exemplified embodiment of a method in accordance with the invention for configuring welding parameters.

FIG. 6 shows a flow diagram for illustrating an exemplified embodiment of a method in accordance with the invention for configuring welding parameters of a welding device by means of a manually actuatable operating panel 1 of a welding device.

In the method schematically illustrated in FIG. 6, the welding parameters, to be configured, of the welding device can be configured by the following main steps.

In a first step S1, the operating panel 1 is switched to a welding parameter selection mode. This is preferably effected by pushing an operating element 3 of the operating panel 1, e.g. a manually actuatable operating element 3 in the form of a control dial.

As soon as the operating panel 1 has been switched to the welding parameter selection mode, the operating element 3 of the operating panel 1 can then be rotated in the clockwise or anti-clockwise direction in step S2 for selecting a welding parameter to be configured.

Then, the user can switch the operating panel 1 from the welding parameter selection mode to the welding parameter editing mode by pushing the operating element 3 again in step S3.

As soon as the operating panel has been switched to the welding parameter editing mode by pushing the operating element 3, the user can set parameter values of the selected welding parameter, to be configured, e.g. for setting a desired value, by rotating the operating element 3 in the clockwise or anti-clockwise direction.

After all the desired welding parameters have been set with corresponding welding parameter values, the welding process can be initiated or started. Then, the operating panel 1 of the welding device is switched to a welding parameter display mode.

In one possible embodiment, the parameter value, set in the welding parameter editing mode, of the welding parameter to be configured is stored in an internal data memory of the welding device and is read out from the data memory during the subsequent welding process performed by the welding current source 11 of the welding device. In one possible embodiment variant, the data memory can also be integrated in the operating panel 1.

Figure 7:
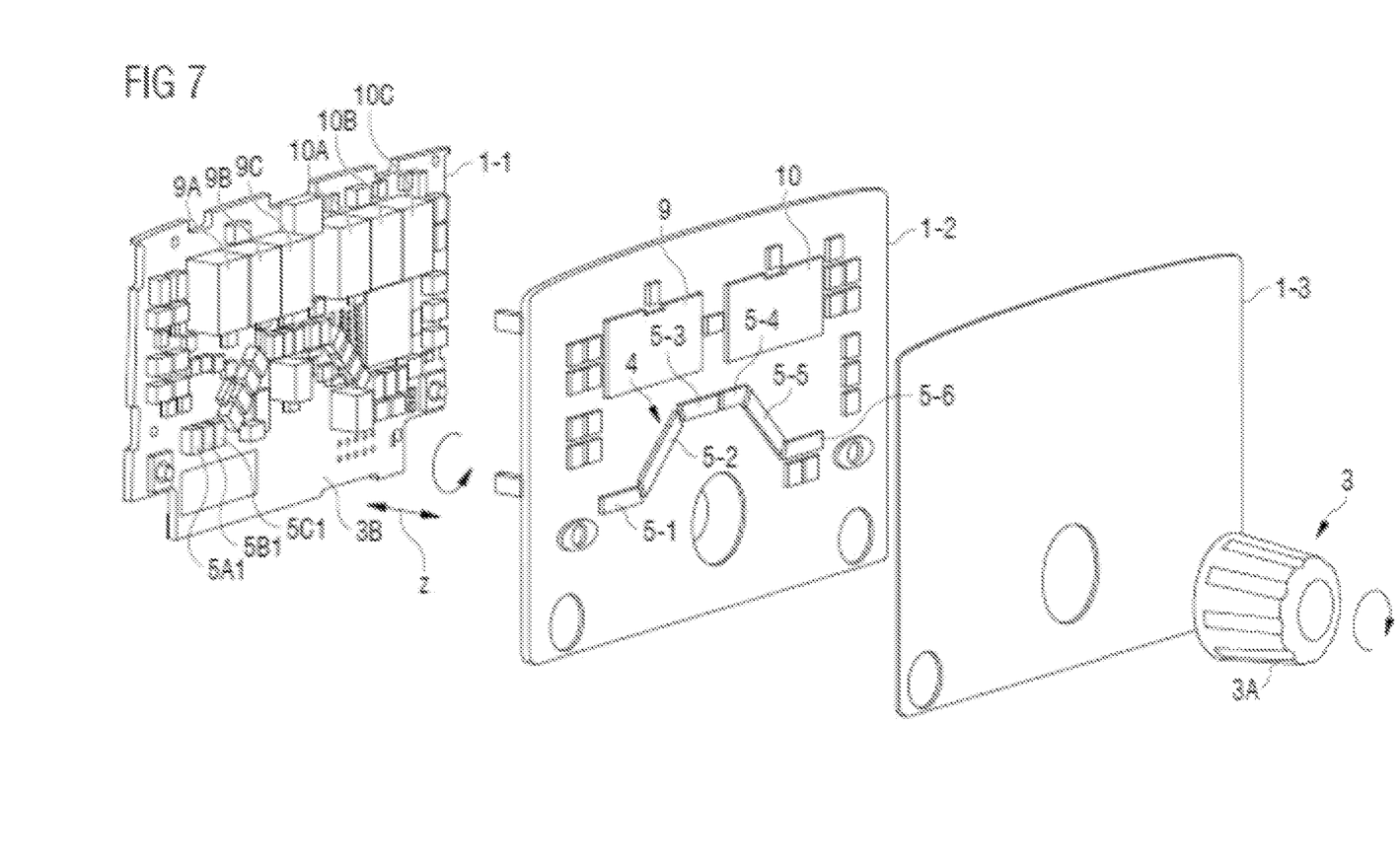
FIG. 7 shows an exploded view of one possible embodiment of the operating panel in accordance with the invention.

FIG. 7 shows an exploded view of one possible embodiment variant of the operating panel 1 in accordance with the invention. The operating panel 1 comprises a circuit board 1-1 fitted with electronic components, a so-called spacer grid 1-2 and a front element 1-3 which can be combined. Different lettering can be printed on the front element 1-3, wherein for the remainder the front element 1-3 is transparent. The partitioned function curve 4 has different display segments 5-1, wherein each display segment 5-i of the partitioned function curve 4 of the spacer grid 1-2 comprises a transparent synthetic material block which can be illuminated by one or more lighting means which can be dimmed. These lighting means which can be dimmed, or light-emitting diodes, are located on the circuit board 1-1 fitted with electronic components, as shown in FIG. 7. In the illustrated exemplified embodiment, each display segment or each associated transparent synthetic material block 5-i has three light-emitting diodes located behind it, as can be seen in FIG. 7. The surface, directed towards the user, of each transparent synthetic material block 5-i of the partitioned function curve 4 is surface-treated preferably to increase light scattering.

Controllable segment displays 9A, 9B, 9C and 10A, 10B, 10C are preferably located behind the windows for the digital displays 9, 10 respectively, for illustrating a digital number.

The operating element 3 comprises an operating button 3A which can be fitted on an actuatable control dial 3B through an opening in the front element 1-3 and through an opening in the spacer grid 1-2. The control dial 3B can be rotated and can additionally be switched back and forth in two positions in the Z direction, as shown in FIG. 7. Preferably, the manually actuatable operating element 3 with the control dial 3B is an operating wheel which can be set in an incremental manner.

Figure 8:
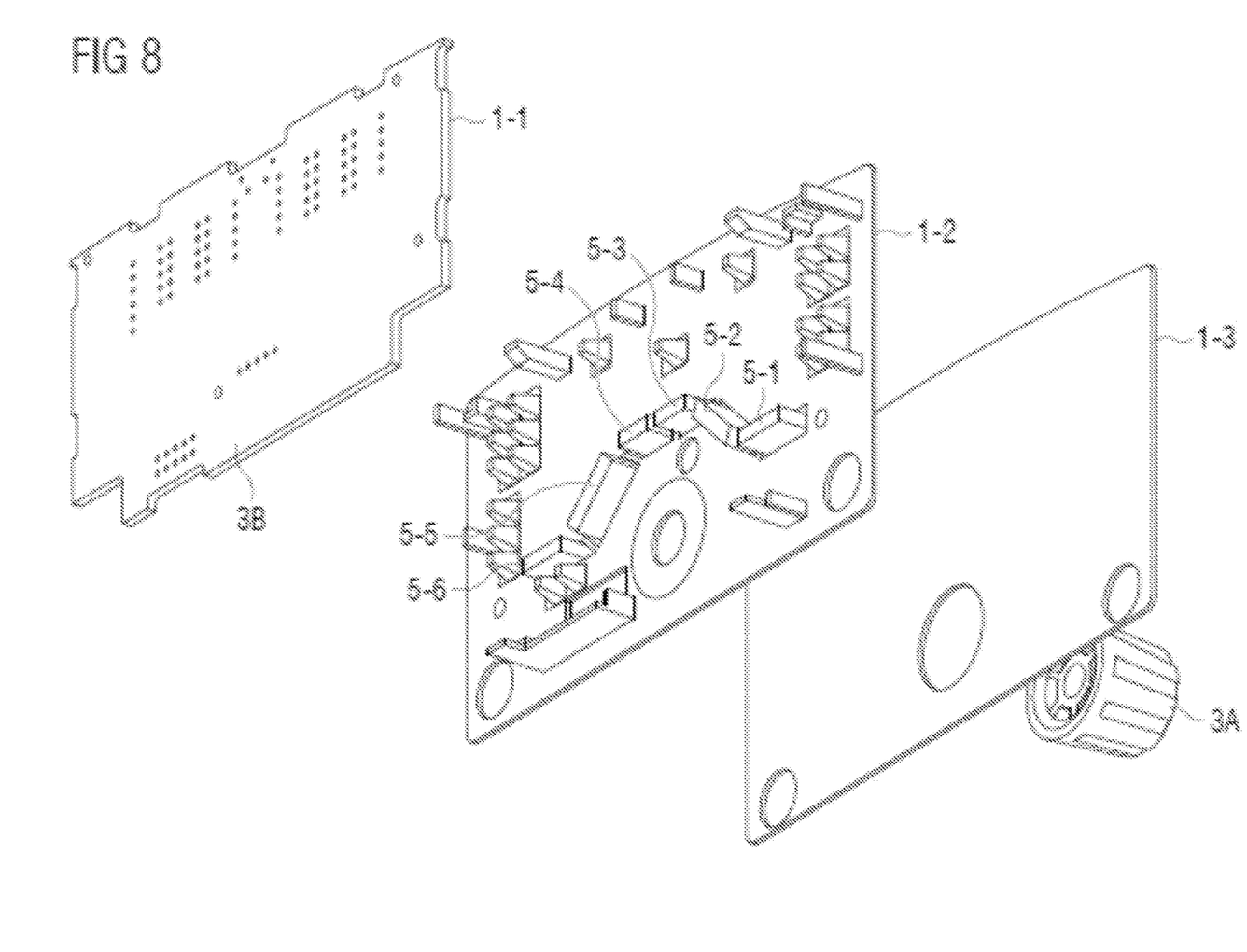
FIG. 8 shows a further exploded view for illustrating an exemplified embodiment of the operating panel in accordance with the invention.

FIG. 8 shows a further exploded view of the operating panel 1 from behind. In the exploded view shown in FIG. 8, the rear side of the spacer grid 1-2 can be seen, in particular the different synthetic material blocks of the display segments 5-i within the partitioned function curve 4.

Figure 9:
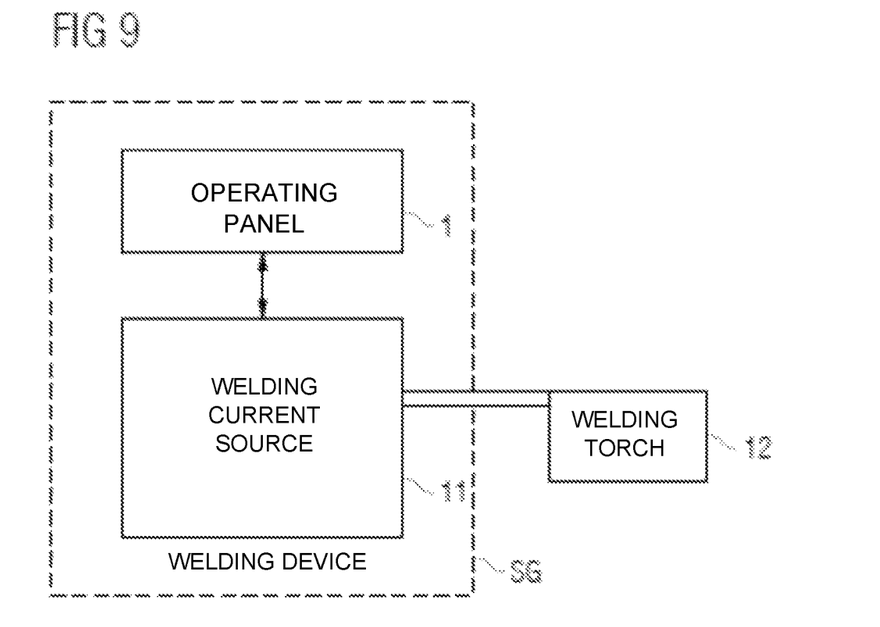
FIG. 9 shows a schematic block diagram for illustrating one possible embodiment of a welding device in accordance with the invention.

FIG. 9 schematically shows a welding device SG in accordance with the invention having an operating panel 1 in accordance with the invention and a welding current source 11 connected thereto for performing a welding process using a welding torch 12 connected thereto. During the welding process, the welding current source 11 physically sets the welding parameters during the welding process corresponding to the parameter values, set in the welding parameter editing mode, of the welding parameters selected in the welding parameter selection mode. The current, actually set welding parameter values are displayed to the user by the operating panel 1 during the welding process in the welding parameter display mode.

The spacer grid 1-2 can ensure that the function curve 4 is displayed as a homogeneously illuminated line.

The operating panel 1 illustrated in FIGS. 1 to 9 shows one possible exemplified embodiment, wherein variations in the operating panel 1 are possible. For example, the operating panel 1 can contain a plurality of operating elements 3. Furthermore, in one possible embodiment variant, an analogue display can also be provided instead of a digital display 9, 10 for example. Furthermore, the shape and partitioning of the function curve 4 can vary for different welding devices. In a further possible embodiment, a plurality of partitioned function curves W can be provided on the welding parameter display unit 2. Further operating modes are also possible, e.g. a plurality of editing modes, in particular for roughly or finely adjusting welding parameter values.

In a further possible embodiment of the operating panel in accordance with the invention, the operating panel comprises, in addition to the welding parameter editing mode, the welding parameter selection mode and the welding parameter display mode, a further welding parameter set-up mode which allows background welding parameters to be additionally set in addition to the main welding parameters. These background welding parameters comprise welding parameters which are amended or set relatively rarely. In one possible embodiment, the background welding parameters substantially comprise a gas pre-flow time, a gas post-flow time, a pulse frequency, a duty cycle, a pulse background, a starting current time, a final current time and/or gas flushing parameters. Furthermore, in the set-up mode, corresponding factory settings can also be restored (FAC Factory Reset). In one possible embodiment variant, in the set-up operating mode a switch can be made back and forth for the background welding parameters between a selection mode and an editing mode, in particular by pushing or pulling the operating element 3. In one possible embodiment, the set-up mode is reached by simultaneously pushing two keys on the welding parameter display unit 2.

The invention claimed is:

1. An operating panel for a welding device comprising:
a welding parameter display unit for displaying welding parameters, and
at least one operating element which can be actuated manually by a user,
characterized in that;
the at least one operating element is operable to switch the operating panel between a welding parameter selection mode and a welding parameter editing mode;
in the welding parameter selection mode one of the welding parameters of the welding parameter display unit can be selected by rotating the operating element;
in the welding parameter editing mode a parameter value of a selected welding parameter of the welding parameter display unit can be set by rotating the operating element;
the operating panel is configured and operable to switch to a welding parameter display mode after a welding process is started by the welding device;
the welding parameters in a partitioned function curve of the welding parameter display unit of the operating panel are sequentially displayed after the welding process has started in the welding parameter display mode in different successive phases of the welding process corresponding to the parameter value set in the welding parameter editing mode and are physically set for performing the welding process by a welding current source of the welding device;
a welding parameter is displayed in each case by an associated display segment of a partitioned function curve of the welding parameter display unit;
in the welding parameter editing mode, the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are not illuminated by the associated lighting means; and in the welding parameter selection mode, the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are illuminated by the associated lighting means with dimmed illuminating power.

2. The operating panel as claimed in claim 1, wherein the manually actuatable operating element comprises an operating wheel which can be set in an incremental manner.

3. The operating panel as claimed in claim 1, wherein the display segment of the partitioned function curve of the welding parameter display unit comprises a transparent synthetic material block which can be illuminated by one or more lighting means, which can be dimmed, in particular light-emitting diodes, LEDs.

4. The operating panel as claimed in claim 3, wherein the surface, directed towards the user, of each transparent synthetic material block of a display segment of the partitioned function curve is surface-treated to increase light scattering.

5. The operating panel as claimed in claim 1, wherein, in the welding parameter display mode, the display segment of the currently active welding parameter physically set by the welding current source of the welding device within the partitioned function curve of the welding parameter display unit is illuminated by the associated lighting means with dimmed illuminating power.

6. The operating panel as claimed in claim 1,
wherein the operating panel comprises at least one digital display for displaying a parameter value of a welding parameter selected in the welding parameter selection mode or a welding parameter actively set by the welding current source of the welding device during the welding process.

7. A welding device comprising:
an operating panel as claimed in claim 1, and
a welding current source for setting welding parameters during the welding process corresponding to the parameter values, set in the welding parameter editing mode, of the welding parameters selected in the welding parameter selection mode.

8. A method for configuring welding parameters of a welding device by means of a manually actuatable operating panel of the welding device as claimed in claim 1,
wherein for each welding parameter to be configured, the following steps are performed:
(a) switching the operating panel to a welding parameter selection mode by pulling or pushing an operating element of the operating panel,
(b) rotating the operating element in the welding parameter selection mode to select the welding parameter to be configured,
(c) switching from the welding parameter selection mode to a welding parameter editing mode of the welding device by pushing the operating element of the operating panel again, and
(d) rotating the operating element in the welding parameter editing mode to set a parameter value of the selected welding parameter to be configured,
wherein after a welding process performed by the welding device has started, the operating panel switches to a welding parameter display mode, wherein the welding parameters in the partitioned function curve of the welding parameter display unit of the operating panel are sequentially displayed after the welding process has started in the welding parameter display mode in different successive phases of the welding process corresponding to the parameter value set in the welding parameter editing mode and are physically set for performing the welding process by a welding current source of the welding device;
wherein, in the welding parameter editing mode, a display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are not illuminated by the associated lighting means; and
wherein, in the welding parameter selection mode, the display segment of the selected welding parameter within the partitioned function curve of the welding parameter display unit is illuminated by the associated lighting means with full undimmed illuminating power whilst the display segments of the remaining unselected welding parameters within the partitioned function curve of the welding parameter display unit are illuminated by the associated lighting means with dimmed illuminating power.

9. The method as claimed in claim 8, wherein the parameter value, set in the welding parameter editing mode, of the welding parameter to be configured is stored in a data memory of the welding device and is read out from the data memory and physically set during a subsequent welding process performed by a welding current source of the welding device.

10. Operating panel as claimed in claim 2, wherein the display segment of the partitioned function curve of the welding parameter display unit comprises a transparent synthetic material block which can be illuminated by one or more lighting means, which can be dimmed, in particular light-emitting diodes, LEDs.

* * * * *